United States Patent
Yin et al.

(10) Patent No.: US 9,841,029 B2
(45) Date of Patent: Dec. 12, 2017

(54) MOTOR OF A CEILING FAN

(71) Applicant: Sunonwealth Electric Machine Industry Co., Ltd., Kaohsiung (TW)

(72) Inventors: Tso-Kuo Yin, Kaohsiung (TW); Duo-Nian Shan, Kaohsiung (TW)

(73) Assignee: Sunonwealth Electric Machine Industry Co., Inc., Kaohsiung (TW)

( * ) Notice: Subject to any disclaimer, the term of this patent is extended or adjusted under 35 U.S.C. 154(b) by 633 days.

(21) Appl. No.: 14/489,574

(22) Filed: Sep. 18, 2014

(65) Prior Publication Data

US 2015/0176588 A1    Jun. 25, 2015

(30) Foreign Application Priority Data

Dec. 24, 2013 (TW) .............................. 102148019 A

(51) Int. Cl.
| | | |
|---|---|---|
| *F04D 25/08* | (2006.01) | |
| *H02K 5/173* | (2006.01) | |
| *H02K 7/08* | (2006.01) | |
| *F04D 25/06* | (2006.01) | |

(52) U.S. Cl.
CPC ......... *F04D 25/088* (2013.01); *F04D 25/062* (2013.01); *H02K 5/1737* (2013.01); *H02K 7/085* (2013.01)

(58) Field of Classification Search
CPC .... H02K 5/165; H02K 5/1677; H02K 5/1737; F04D 25/088; F04D 25/0613; F04D 25/062
USPC ............... 310/90; 417/423.12, 423.14, 424.1
See application file for complete search history.

(56) References Cited

U.S. PATENT DOCUMENTS

| | | | | |
|---|---|---|---|---|
| 2,956,632 A | * | 10/1960 | Forbush | B60B 27/00 180/385 |
| 3,914,071 A | * | 10/1975 | Friese | F04D 29/059 184/6.27 |
| 4,203,704 A | * | 5/1980 | Saint-Amand | F04D 29/059 416/93 R |
| 4,438,359 A | * | 3/1984 | Royer | H02K 5/1735 310/68 R |
| 7,615,898 B2 | | 11/2009 | Chang | |
| 2010/0109465 A1 | | 5/2010 | Yang et al. | |
| 2013/0319353 A1 | * | 12/2013 | Bitzer | F01P 1/00 123/41.49 |

FOREIGN PATENT DOCUMENTS

| | | |
|---|---|---|
| CN | 2321157 Y | 5/1999 |
| CN | 2560779 Y | 7/2003 |
| CN | 101089413 A | 12/2007 |
| CN | 201865944 U | 6/2011 |
| CN | 202997876 U | 6/2013 |
| DE | 2618161 | * 11/1977 ........... H02K 5/1737 |

* cited by examiner

*Primary Examiner* — Burton Mullins
(74) *Attorney, Agent, or Firm* — Alan D. Kamrath; Kamrath IP Lawfirm, P.A.

(57) ABSTRACT

A motor of a ceiling fan includes a shaft, a bearing sleeve, a limiting member, a stator and a rotor. The shaft has a first shoulder and a second shoulder. The bearing sleeve receives a first bearing and a second bearing for supporting the shaft and has an inner flange, with the inner flange and the first shoulder jointly clamping and positioning the first bearing. The limiting member and the second shoulder jointly clamp and position the second bearing. The stator is arranged around the shaft. The rotor couples with the bearing sleeve.

14 Claims, 9 Drawing Sheets

MOTOR OF A CEILING FAN

BACKGROUND OF THE INVENTION

1. Field of the Invention

The present invention generally relates to a motor of a ceiling fan and, more particularly, to a motor receiving a plurality of bearings by a sleeve.

2. Description of the Related Art

Referring to FIG. 1, a conventional motor of a ceiling fan with a reference number of "9," of a Taiwan publication number of I326959 and entitled as "DC Brushless Motor for Ceiling Fan with Improved Stator and Rotor", is shown, which includes a stator 91 and a rotor 92. The stator 91 has a core 911, a plurality of coils 912 wound on the core 911, and a shaft 913 passing through the core 911. The rotor 92 has an upper shield 921, a lower shield 922 and a waist ring 923 sandwiched by the upper and lower shields 921, 922. Each of the upper and lower shields 921, 922 combines with a bearing 924 for the shaft 913 to couple with, and the stator 91 is received in a room defined by the upper shield 921, lower shield 922 and waist ring 923.

In the above structure, the rotor 92 of the motor 9 rotatably couples with the shaft 913 of the stator 91 via the bearings 924, and, thus, the shaft 913 has to couple with the bearings 924 by press fit, to ensure a stable rotation of the rotor 92 about the stator 91 and to avoid the inner rings of the bearings 924 rotating relative to the shaft 913. In other words, due to the press fit between the shaft 913 and the bearings 924, which can only be achieved by a machine able to apply opposite pressures to the bearings 924 and the shaft 913 respectively, the steps for assembly of this conventional motor 9 are complicated and time-consumptive. Besides, since the conventional motor 9 has a size large enough to operate blades of the ceiling fan, the costs of settling and maintaining said machine are usually high, and, thus, the manufacture cost of the conventional motor 9 is also high.

Additionally, due to the press fit between the shaft 913 and the bearings 924, the vibration caused by operation of the rotor 92 can be easily and directly transmitted to the shaft 913 through the bearings 924, and thus affects electrical devices in the stator 91 or other members connecting with the shaft 913. This transmitted vibration can largely increase the failure rates of said devices and members, and decrease the lifetime of the motor 9 therefore.

As a result, since the conventional motor 9 for the ceiling fan has drawbacks such as a "complicated assembly process" and a "shortened lifetime," it is necessary to improve the conventional motor 9.

It is therefore the objective of this invention to provide a motor of a ceiling fan with first and second bearings axially clamped and thus coupling with a shaft other than by press fitting, so that this motor of the ceiling fan can be easily assembled.

Another objective of this invention is to provide a motor of a ceiling fan with a resilient member between the second bearing and a second shoulder or between the first bearing and a first shoulder for depressing the vibration generated by rotation of a rotor and reducing the negative affects toward the operation of a stator or members connecting with the shaft due to said vibration, to prolong the lifetime of the motor of the ceiling fan.

One embodiment of the invention discloses a motor of a ceiling fan, which includes a shaft, a bearing sleeve, a limiting member, a stator and a rotor. The shaft has a first shoulder and a second shoulder. The bearing sleeve receives a first bearing and a second bearing for supporting the shaft and has an inner flange, with the inner flange and the first shoulder jointly clamping and positioning the first bearing. The limiting member and the second shoulder jointly clamp and position the second bearing. The stator is arranged around the shaft. The rotor couples with the bearing sleeve.

SUMMARY OF THE INVENTION

In a preferred form shown, the first bearing has an outer ring and an inner ring, the second bearing also has an outer ring and an inner ring, the bearing sleeve abuts against outer peripheries of the outer rings, and the shaft extends through and couples with the inner rings.

In the preferred form shown, the bearing sleeve has an annular wall, a first opening and a second opening, the annular wall defining a receiving space inside to receive the first and second bearings, the first and second openings are at two axial ends of the bearing sleeve and communicate with the receiving space, and the inner flange serves as the end with the first opening and extends toward the shaft from the annular wall. In the preferred form shown, the bearing sleeve has an annular wall, a first opening and a second opening, the annular wall defining a receiving space inside to receive the first and second bearings, the first and second openings are at two axial ends of the bearing sleeve and communicate with the receiving space, and the inner flange formed in one of the two axial ends having the first opening and extends toward the shaft from the annular wall.

In the preferred form shown, the bearing sleeve has an inner groove adjacent to and spaced from the second opening, and the limiting member is partially inserted in the inner groove.

In the preferred form shown, the limiting member abuts against the outer ring of the second bearing.

In the preferred form shown, the limiting member is connected to an axial end of the annular wall and abuts against the outer ring of the second bearing, with said axial end having the second opening.

In the preferred form shown, the inner flange abuts against the outer ring of the first bearing.

In the preferred form shown, a buffering member is arranged between the inner flange and the outer ring of the first bearing and abuts against the inner flange and the first bearing by two ends respectively.

In the preferred form shown, the stator firmly mounts on the shaft, and the rotor firmly mounts on outer periphery of the annular wall of the bearing sleeve.

In another preferred form shown, a resilient member is arranged between the second bearing and the second shoulder, and abuts against the inner ring of the second bearing and the second shoulder by two ends respectively.

In said another preferred form shown, the resilient member is a spring.

In further another preferred form shown, a resilient member is arranged between the first bearing and the first shoulder, and abuts against the inner ring of the first bearing and the first shoulder by two ends respectively.

In said further another preferred form shown, the resilient member is a spring.

In still another preferred form shown, the shaft has a thick section to form the first and second shoulders at two opposite ends thereof, each of the first and second shoulders has an abutting surface, and the abutting surfaces of the first and second shoulders face away from each other.

In still another preferred form shown, the inner rings of the first and second bearings couple with the shaft other than by press fitting.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
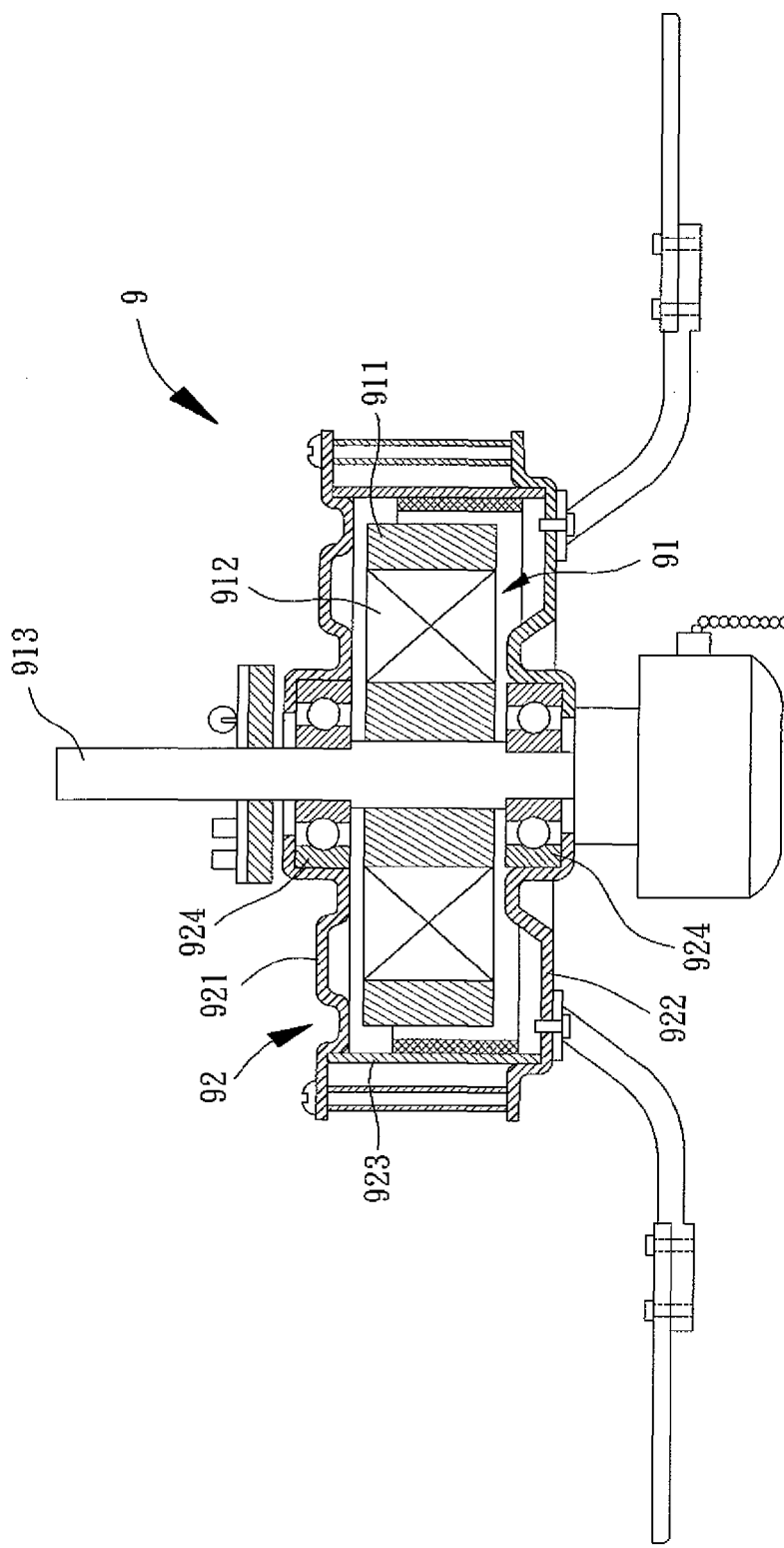
FIG. 1 is a cross-sectional view of a conventional motor of a ceiling fan.

In the various figures of the drawings, the same numerals designate the same or similar parts. Furthermore, when the term "first," "second," "third," "fourth," "fifth," "inner," "outer," "beneath," "above" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
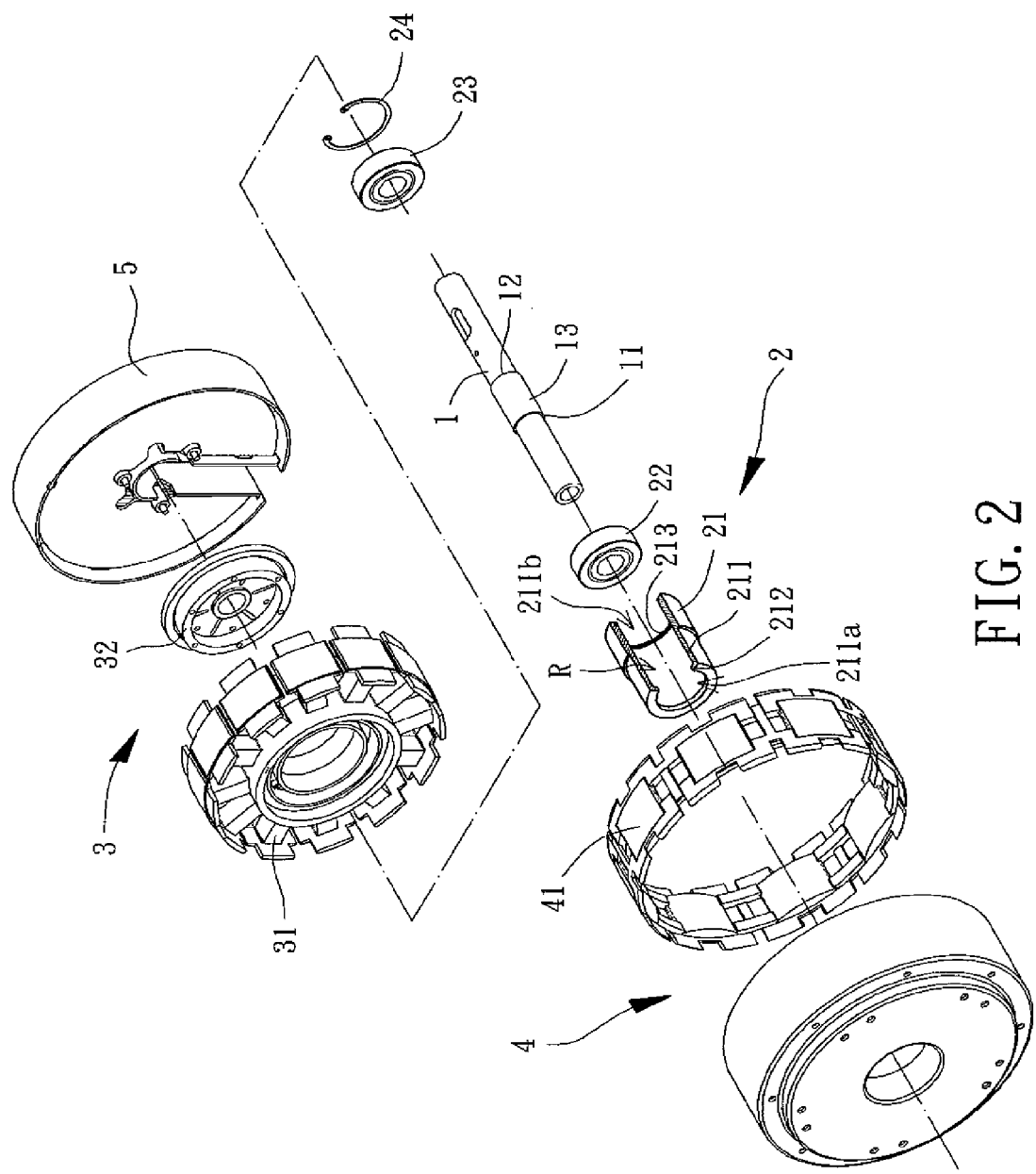
FIG. 2 is an exploded and perspective view of a motor of a ceiling fan according to a first embodiment of the invention.

Referring to FIG. 2, a first embodiment of a motor of a ceiling fan of the present invention is shown. Although the shown motor is an outer-rotor-type motor, this outer-rotor-type motor can be replaced by an inner-rotor-type motor through a conventional modification. The motor of this first embodiment includes a shaft 1 and a bearing module 2 coupling with each other. The shaft 1 has a first shoulder 11 and a second shoulder 12, with each of the shoulders 11, 12 having an abutting surface and with the abutting surfaces thereof facing away from each other. Namely, the abutting surface of the first shoulder 11 and the abutting surface of the second shoulder 12 face toward opposite ends of the shaft 1. Preferably, the shaft 1 has a thick section 13 with a radial extension, to form the first and second shoulders 11, 12 at two opposite ends of the thick section 13. Specifically, the thick section 13 can be provided by integrally forming an radial protrusion on the outer periphery of the shaft 1 or by coupling a sleeve around the outer periphery of the shaft 1.

Figure 3:
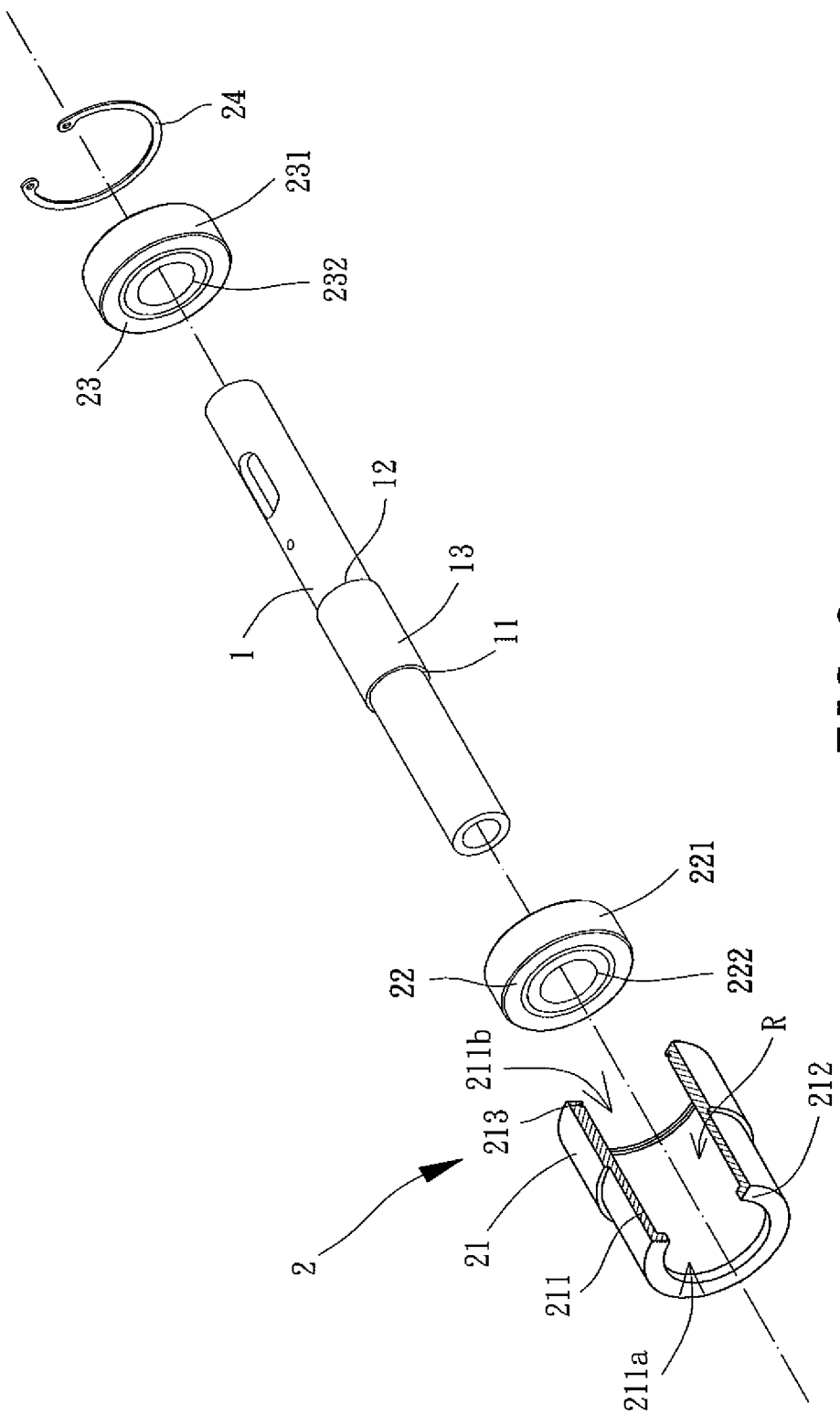
FIG. 3 is an exploded and perspective view of a shaft and a bearing module of the motor according to the first embodiment.

Referring to FIGS. 2 and 3, the bearing module 2 includes a bearing sleeve 21, a first bearing 22 and a second bearing 23. The first and second bearings 22, 23 are received inside the bearing sleeve 21 for supporting the shaft 1 and abut against the first and second shoulders 11, 12 respectively.

The bearing sleeve 21 has an annular wall 211 defining a receiving space "R" inside to receive the first and second bearings 22, 23. An inner periphery of the annular wall 211, which faces the receiving space "R," abuts against the first and second bearings 22, 23. Besides, the bearing sleeve 21 has a first opening 211a and a second opening 211b at two axial ends thereof, with both openings 211a, 211b communicating with the receiving space "R." Therefore, the shaft 1 can extend through the receiving space "R" via the first opening 211a, first bearing 22, second bearing 23, and second opening 211b sequentially. Additionally, the bearing sleeve 21 further has an inner flange 212 formed in one of the two axial ends having the first opening 211a and extending toward the shaft 1 from the annular wall 211, to axially position the first bearing 22. Preferably, in addition to the bearing sleeve 21, first bearing 22 and second bearing 23, the bearing module 2 has a limiting member 24, and the bearing sleeve 21 further has an inner groove 213 adjacent to but spaced from the second opening 211b. The limiting member 24 is partially inserted in the inner groove 213 for a part of the limiting member 24 to protrude inwardly from the inner periphery of the annular wall 211, to axially abut against and position the second bearing 23. Preferably, the limiting member 24 is in the form of an elastic retaining ring or an elastic C-shaped ring.

Specifically, the first bearing 22 has an outer ring 221 and an inner ring 222, and the second bearing 23 also has an outer ring 231 and an inner ring 232. Each of the outer rings 221, 231 is able to rotate about a respective one of the inner rings 222, 232. The annular wall 211 of the bearing sleeve 21 abuts against outer peripheries of the outer rings 221, 231; the shaft 1 extends through and couples with the inner rings 222, 232; the abutting surface of the first shoulder 11 abuts against the inner ring 222 of the first bearing 22; and the abutting surface of the second shoulder 12 abuts against the inner ring 232 of the second bearing 23. Furthermore, the inner flange 212 axially positions the first bearing 22 by contacting the outer ring 221 of the first bearing 22, and, thus, the first bearing 22 can be clamped by and stably positioned between the inner flange 212 and the first shoulder 11. Similarly, the limiting member 24 axially positions the second bearing 23 by contacting the outer ring 231 of the second bearing 23, and, thus, the second bearing 23 can be clamped by and stably positioned between the limiting member 24 and the second shoulder 12.

Figure 4:
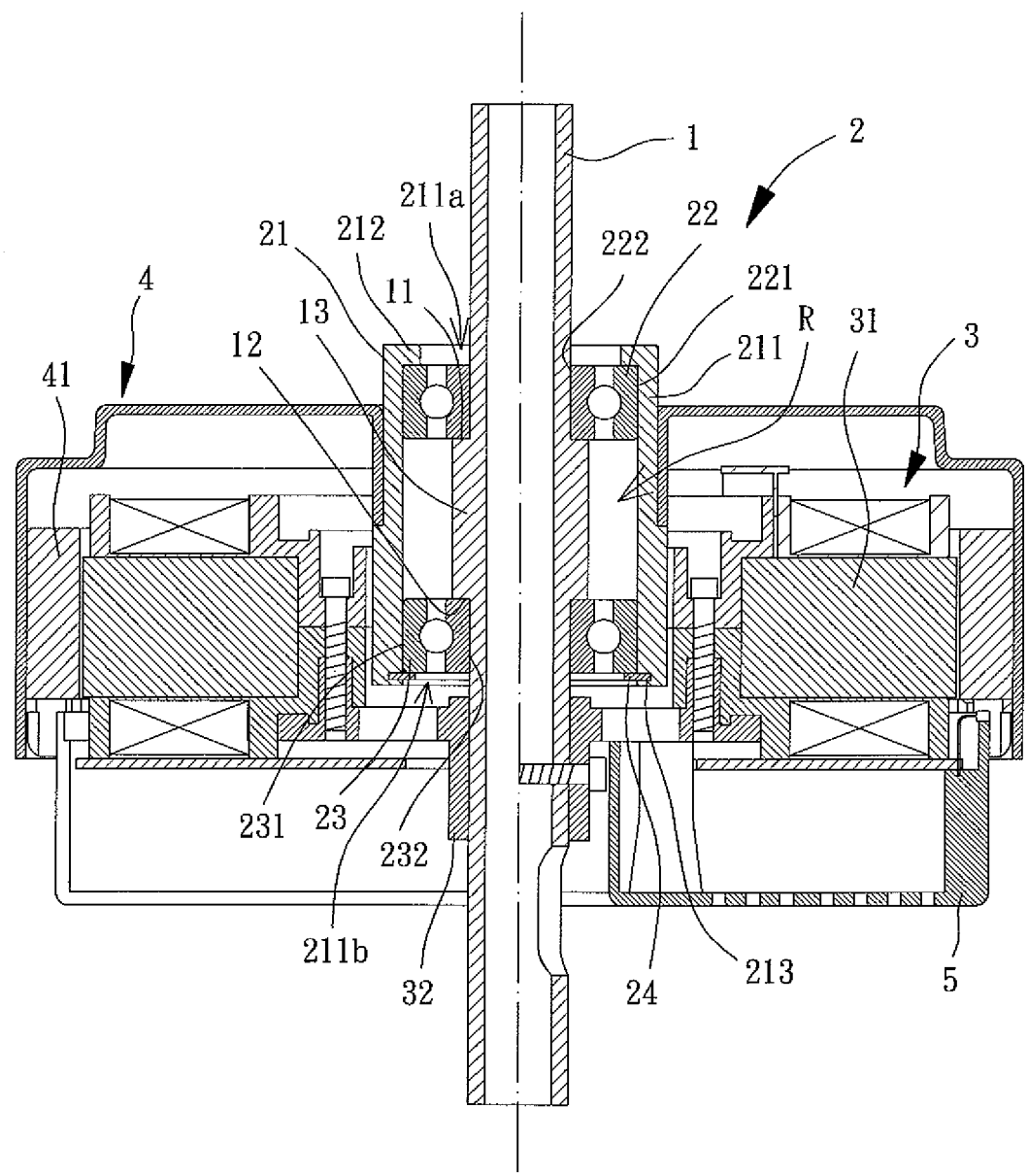
FIG. 4 is a cross-sectional view of the motor according to the first embodiment.

Please refer to FIGS. 2 and 4, which show that the motor of a ceiling fan further includes a stator 3 and a rotor 4, with the stator 3 firmly arranged around the shaft 1 and with the rotor 4 coupling with the bearing sleeve 21. The rotor 4 is adapted to connect with blades of the ceiling fan. In this embodiment, the stator 3 firmly mounts on the shaft 1, and the rotor 4 firmly mounts on an outer, periphery of the annular wall 211 of the bearing sleeve 21. The stator 3 has a core 31, and the rotor 4 has a magnet module 41 arranged close to the core 31. The magnet module 41 has a plurality of pole faces facing and spaced from the core 31 by a gap. Therefore, the outer rings 221, 231 of the first and second bearings 22, 23 rotate with the bearing sleeve 21 and the rotor 4, and the inner rings 222, 232 of the first and second bearings 22 and 23 are steadily positioned with the shaft 1 and the stator 3. Since both of the stator 3 and the rotor 4 are of structures of a conventional motor, they are not further illustrated in detail.

The core 31 of the stator 3 connects with a base 5 through a linking seat 32, and the base 5 is close to the second opening 211b and away from the first opening 211a. When this motor of the ceiling fan is in use, the shaft 1 is fixed to the ceiling with an end extending out of the bearing sleeve 21 from the first opening 211a, the base 5 is beneath and spaced from the ceiling, and the rotor 4 is arranged between the base 5 and the ceiling. With the above arrangement, the heat generated inside this motor can be easily dissipated from the area between the base 5 and the ceiling.

With the illustrated structures of the motor of the first embodiment, an assembling process for mounting the bearing module 2 onto the shaft 1 can be performed according to the following. First, the first and second bearings 22, 23 of the bearing module 2 are disposed around the shaft 1 by two ends of the shaft 1 respectively. Second, the first and second bearings 22, 23 are sheathed inside the bearing sleeve 21, with the bearing sleeve 21 coupling with the outer rings 221, 231 of the bearings 22, 23 and with the inner flange 212 abutting against the outer ring 221 of the first bearing 22. Finally, after the limiting member 24 couples with the bearing sleeve 21 and abuts against the outer ring 231 of the second bearing 23, the assembling process of the combination of the shaft 1 and bearing module 2 is completed. Through the above process, the first bearing 22 is firmly clamped by and positioned between the inner flange 212 and the first shoulder 11, and the second bearing 23 is firmly clamped by and positioned between the second shoulder 12 and the limiting member 24. Therefore, since the first and second bearings 22, 23 are firmly positioned, the inner rings 222, 232 of the first and second bearings 22, 23 and not coupled with the shaft 1 by a press fit for fixing the axial positions of the bearings 22, 23 relative to the shaft 1, and, thus, the assembling process of this motor is much easier in comparison to those of the conventional motors.

Figure 5:
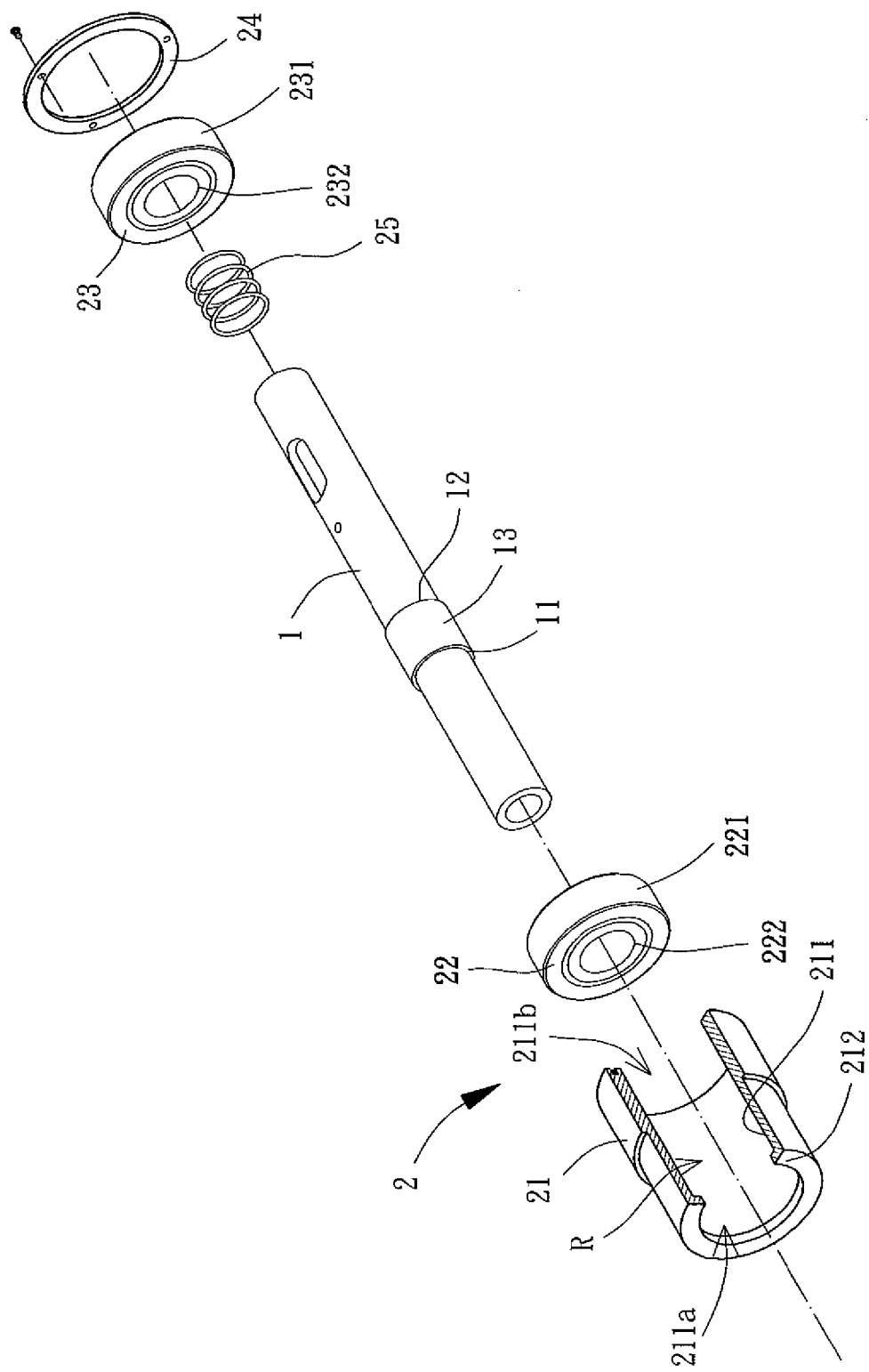
FIG. 5 is an exploded and perspective view of a shaft and a bearing module of a motor of a ceiling fan according to a second embodiment of the invention.
Figure 6:
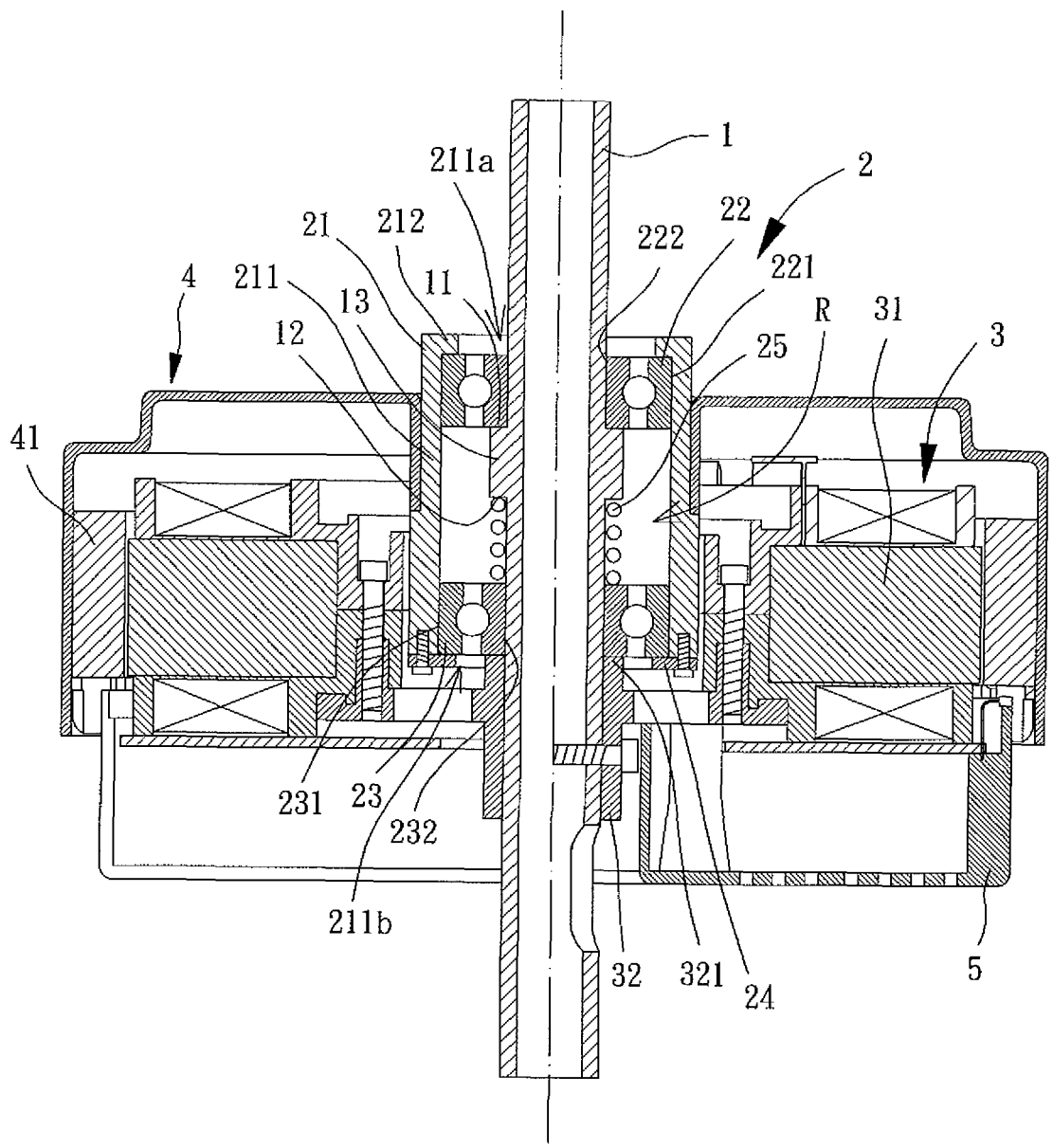
FIG. 6 is a cross-sectional view of the motor according to the second embodiment.

Now, please refer to FIGS. 5 and 6, which show a second embodiment of the motor of the ceiling fan. In comparison with the previously illustrated motor, the bearing module 2 of the motor of the second embodiment further includes a resilient member 25 such as a spring or other conventional resilient buffer device. Preferably, the resilient member 25 is arranged between the second bearing 23 and the second shoulder 12, with two ends of the resilient member 25 abutting against the inner ring 232 of the second bearing 23 and the second shoulder 12 respectively. With this resilient member 25 serving as a buffering device, the vibration generated by rotation of the rotor 4 can be efficiently depressed, and thus said vibration is not transmitted to the shaft 1 via the bearing module 2, to lower the negative affects toward the operation of the stator 3 or members connecting with the shaft 1 such as circuit boards due to said vibration. Alternatively, this resilient member 25 can also be inserted between the first bearing 22 and the first shoulder 11, and abuts against the inner ring 222 of the first bearing 22 and the first shoulder 11 by two ends respectively.

Additionally, in this embodiment, instead of being inserted into the inner groove 213 shown in FIGS. 3 and 4, the limiting member 24 is connected to the axial end of the annular wall 211, with said axial end having the second opening 211b and the limiting member 24 connected to said axial end of the annular wall 211 by screws or elastic hooks. With the above arrangement, in comparison with the way to couple the limiting member 24 with the bearing sleeve 21 by the inner groove 213 which may result in disengagement of the limiting member 24 from the bearing sleeve 21, the coupling strength between the limiting member 24 and the bearing sleeve 21 is enhanced to provide sufficient support to the second bearing 23. Furthermore, the linking seat 32 has an axial protrusion 321 adjacent to the shaft 1 and abutting against the inner ring 232 of the second bearing 23, so that the axial protrusion 321 axially supports the second bearing 23 together with the limiting member 24. Therefore, the second bearing 23 can be positioned between the limiting member 24 and the second shoulder 12 for sure.

Figure 7:
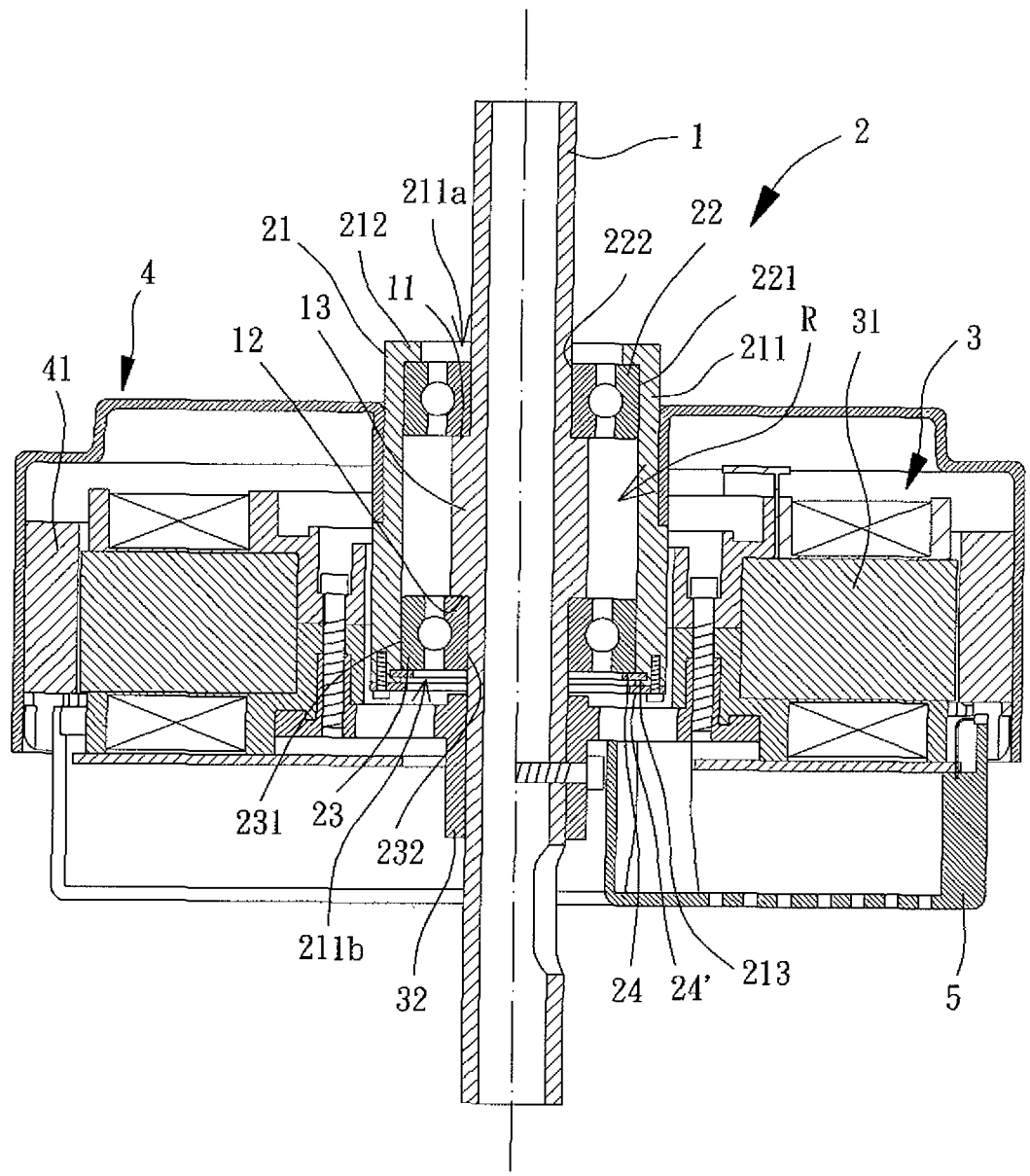
FIG. 7 is a cross-sectional view of a motor of a ceiling fan according to a third embodiment of the invention.

Referring to FIG. 7, a third embodiment of the motor of the present invention is shown. The difference between this motor and that of the first embodiment lies in that the bearing module 2 of this third embodiment further has another limiting member 24'. Namely, in addition to the limiting member 24 inserted in the inner groove 213, the other limiting member 24' is connected to the axial end of the annular wall 211, which forms the second opening 211b. Therefore, the limiting member 24' serves as a backup if the limiting member 24 fails to support the outer ring 231 of the second bearing 23 and also prevents the limiting member 24 from falling out of the receiving space "R" of the bearing sleeve 21.

Figure 8:
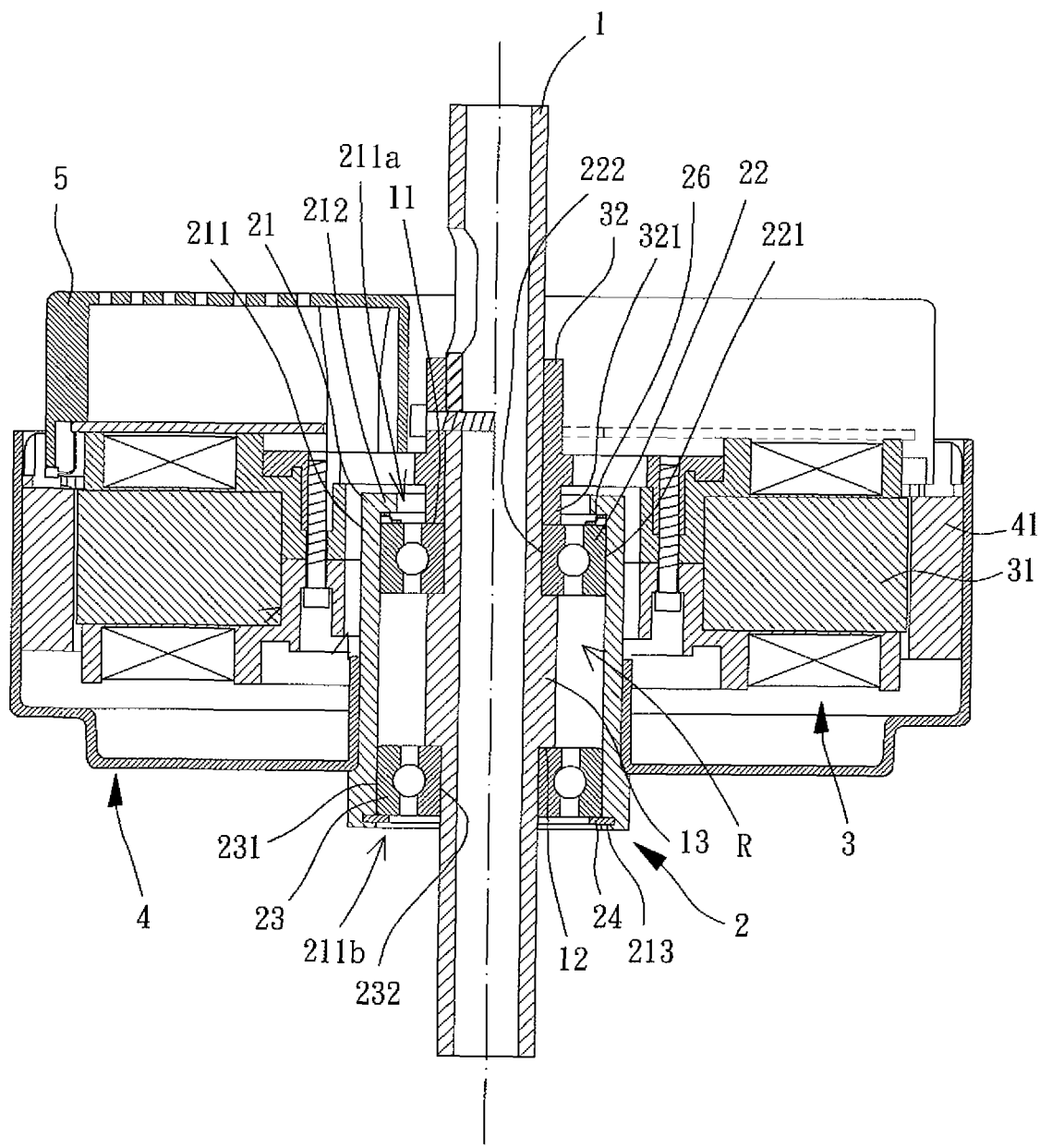
FIG. 8 is a cross-sectional view of a motor of a ceiling fan according to a fourth embodiment of the invention.

Referring to FIG. 8, a fourth embodiment of the motor of the present invention is shown. The difference between this motor and that of the first embodiment lies in that the base 5 is close to the first opening 211a and away from the second opening 211b. Accordingly, when the motor of this fourth embodiment is in use, the shaft 1 is fixed to the ceiling with the end extending out of the bearing sleeve 21 from the first opening 211a, the base 5 is beneath the ceiling, and the rotor 4 is beneath the base 5. Therefore, there is a distance between the rotor 4 and the ceiling large enough for the blades of the rotor 4 to smoothly guide air. Moreover, it is preferable for the bearing module 2 to have a buffering member 26 between the inner flange 212 and the outer ring 221. Specifically, the buffering member 26 is a flat spring abutting against the inner flange 212 and the first bearing 22 by two axial ends respectively. As a result, the buffering member 26 can axially make up for any gap between the inner flange 212 and the first bearing 22 due to tolerance, and also can provide pressure to the first bearing 22 to avoid rotation of the first bearing 22 relative to the bearing sleeve 21.

Figure 9:
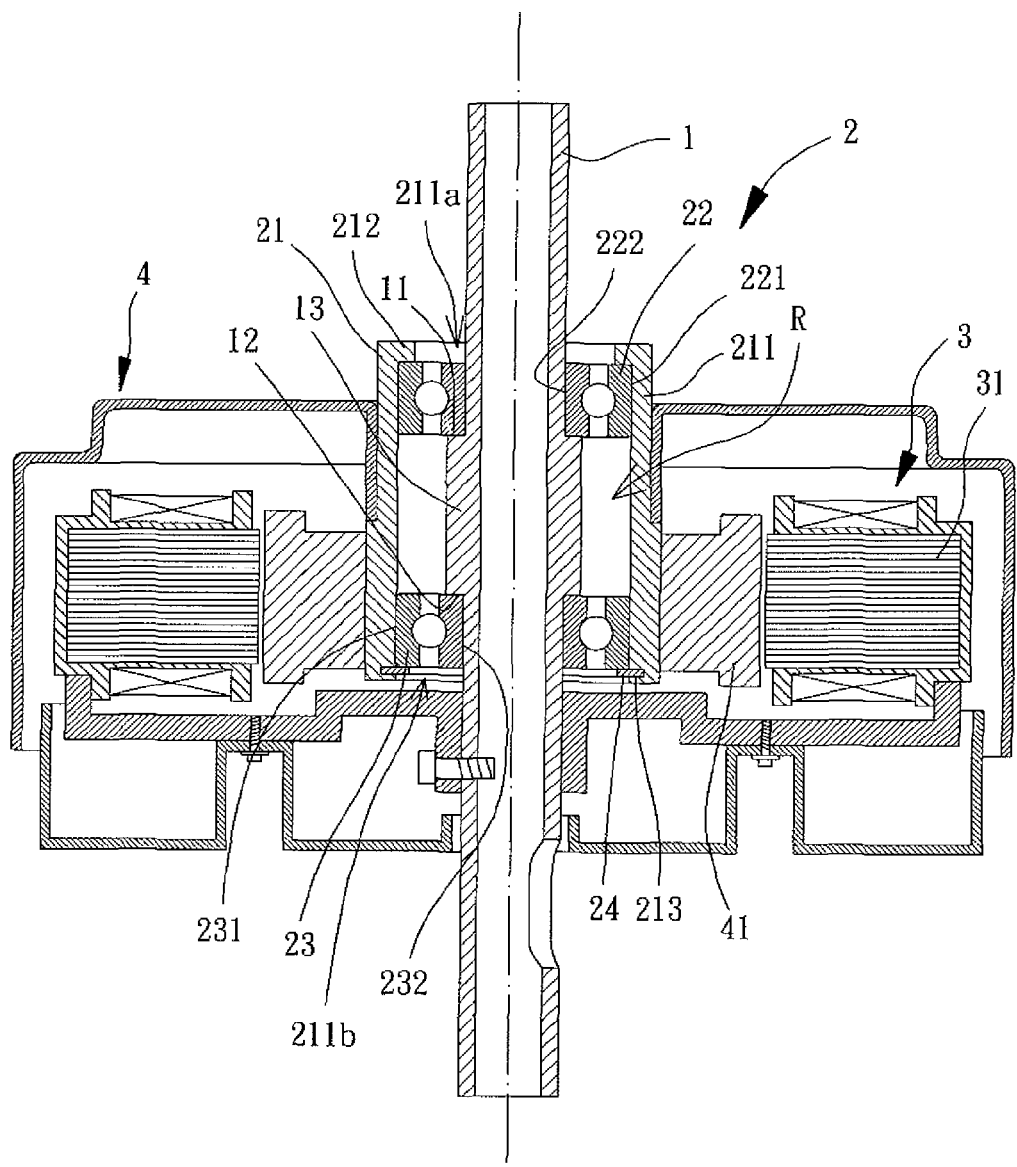
FIG. 9 is a cross-sectional view of a motor of a ceiling fan according to a fifth embodiment of the invention.

Referring to FIG. 9, a fifth embodiment of the motor of the present invention is shown. The difference between this motor and that of the first embodiment lies in that this motor is an inner-rotor-type motor. The magnet module 41 of the rotor 4 is firmly arranged around the bearing sleeve 21, and the stator 3 still firmly mounts on the shaft 1. Accordingly, the outer rings 221, 231 of the first and second bearings 22, 23 rotate with the bearing sleeve 21 and the magnet module 41, and the inner rings 222, 232 of the first and second bearings 22 and 23 are steadily positioned with the shaft 1 and the stator 3. The motor of the ceiling fan of the disclosure can include an outer rotor or an inner rotor.

Based on the structural features above, the characteristics of the first and second embodiments of the disclosure are listed as follows.

Specifically, a shaft 1 is coupled with a bearing module 2. The shaft 1 includes a first shoulder 11 and a second shoulder 12. The bearing module 2 includes a bearing sleeve 21. First and second bearings 22, 23 are received in the bearing sleeve 21 for supporting the shaft 1 and abutting against the first and second shoulders 11, 12 respectively. The bearing sleeve 21 further has an inner flange 212 that is used with the first opening 211a to clamp and retain the first bearing 22 therebetween. The bearing module 2 is further coupled with a limiting member 24 that is used with the second shoulder 12 to clamp and retain the second bearing 23 therebetween. Besides, a stator 3 may be arranged around the shaft 1, and a rotor 4 may be coupled to an outer periphery of the bearing sleeve 21. In this arrangement, the stator 3 and the rotor 4 are coupled with each other via the bearing module 2.

In sum, the inner rings 222, 232 of the motors of the above embodiments couple with the shaft 1 other than by press fitting, and the first and second bearings 22, 23 are still firmly positioned relatively to the shaft 1, since the inner flange 212 and the first shoulder 11 axially sandwich the first bearing 22 as well as the second shoulder 12 and the limiting member 24 axially sandwich the second bearing 23. As a result, it is not necessary to use an additional machine to apply high pressures to the shaft 1 and the first bearing 22 or the second bearing 23, and, thus, the assembling process of these motors is easy, simple and economic. Besides, the resilient member 25 arranged between the second bearing 23 and the second shoulder 12 or between the first bearing 22 and the first shoulder 11 can depress the vibration generated by rotation of the rotor 4. Accordingly, the resilient member 25 avoids the vibration resulting from the rotor 4 transferring toward the stator 3 or members connecting with the shaft 1, to efficiently lower the possibility of failure and to prolong the lifetime of the motors.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor of the ceiling fan comprising:
   a shaft having a first shoulder and a second shoulder;
   a bearing sleeve receiving a first bearing and a second bearing for supporting the shaft, with the bearing sleeve having an inner flange, with the inner flange and the first shoulder jointly clamping and positioning the first bearing;
   a limiting member, with the limiting member and the second shoulder jointly clamping and positioning the second bearing;
   a stator arranged around the shaft; and
   a rotor coupling with the bearing sleeve,
   wherein the shaft has a thick section to form the first and second shoulders at two opposite ends thereof, wherein each of the first and second shoulders has an abutting surface, and wherein the abutting surfaces of the first and second shoulders face away from each other.

2. The motor of the ceiling fan as claimed in claim 1, wherein the first bearing has an outer ring and an inner ring, wherein the second bearing also has an outer ring and an inner ring, wherein the bearing sleeve abuts against outer peripheries of the outer rings, and wherein the shaft extends through and couples with the inner rings.

3. A motor of the ceiling fan, comprising:
   a shaft having a first shoulder and a second shoulder;
   a bearing sleeve receiving a first bearing and a second bearing for supporting the shaft, with the bearing sleeve having an inner flange, with the inner flange and the first shoulder jointly clamping and positioning the first bearing;
   a limiting member, with the limiting member and the second shoulder jointly clamping and positioning the second bearing;
   a stator arranged around the shaft; and
   a rotor coupling with the bearing sleeve,
   wherein the first bearing has an outer ring and an inner ring, wherein the second bearing also has an outer ring and an inner ring, wherein the bearing sleeve abuts against outer peripheries of the outer rings, and wherein the shaft extends through and couples with the inner rings,
   wherein the bearing sleeve has an annular wall, a first opening and a second opening, wherein the annular wall defines a receiving space inside to receive the first and second bearings, wherein the first and second openings are at two axial ends of the bearing sleeve and communicate with the receiving space, and wherein the inner flange is formed in one of the two axial ends having the first opening and extends toward the shaft from the annular wall.

4. The motor of the ceiling fan as claimed in claim 3, wherein the bearing sleeve has an inner groove adjacent to and spaced from the second opening, and the limiting member is partially inserted in the inner groove.

5. The motor of the ceiling fan as claimed in claim 4, wherein the limiting member abuts against the outer ring of the second bearing.

6. The motor of the ceiling fan as claimed in claim 3, wherein the limiting member is connected to another one of the two axial ends of the bearing sleeve and abuts against the outer ring of the second bearing, and wherein the other one of the two axial ends of the bearing sleeve has the second opening.

7. The motor of the ceiling fan as claimed in claim 3, wherein the inner flange abuts against the outer ring of the first bearing.

8. The motor of the ceiling fan as claimed in claim 7, wherein a buffering member is arranged between the inner flange and the outer ring of the first bearing and includes two ends respectively abutting against the inner flange and the first bearing.

9. The motor of the ceiling fan as claimed in claim 3, wherein the stator firmly mounts on the shaft, and wherein the rotor firmly mounts on an outer periphery of the annular wall of the bearing sleeve.

10. The motor of the ceiling fan as claimed in claim 3, wherein a resilient member is arranged between the second bearing and the second shoulder and includes two ends respectively abutting against the inner ring of the second bearing and the second shoulder.

11. The motor of the ceiling fan as claimed in claim 10, wherein the resilient member is a spring.

12. The motor of the ceiling fan as claimed in claim 3, wherein the inner rings of the first and second bearings couple with the shaft other than by press fitting.

13. A motor of the ceiling fan, comprising:
   a shaft having a first shoulder and a second shoulder;
   a bearing sleeve receiving a first bearing and a second bearing for supporting the shaft, with the bearing sleeve having an inner flange, with the inner flange and the first shoulder jointly clamping and positioning the first bearing;
   a limiting member, with the limiting member and the second shoulder jointly clamping and positioning the second bearing;
   a stator arranged around the shaft; and
   a rotor coupling with the bearing sleeve,
   wherein the first bearing has an outer ring and an inner ring, the second bearing also has an outer ring and an inner ring, the bearing sleeve abuts against outer peripheries of the outer rings, and the shaft extends through and couples with the inner rings,
   wherein a resilient member is arranged between the first bearing and the first shoulder and includes two ends respectively abutting against the inner ring of the first bearing and the first shoulder.

14. The motor of the ceiling fan as claimed in claim 13, wherein the resilient member is a spring.

\* \* \* \* \*